United States Patent
Saatchi et al.

(10) Patent No.: US 8,346,279 B1
(45) Date of Patent: Jan. 1, 2013

(54) MOBILE DEVICE NAVIGATION

(75) Inventors: Saeed Saatchi, Middletown, NJ (US);
Ning Zhang, Warren, NJ (US); Rita Sadhvani, Watchung, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 375 days.

(21) Appl. No.: 12/615,726

(22) Filed: Nov. 10, 2009

(51) Int. Cl.
*H04W 72/00* (2009.01)

(52) U.S. Cl. .................. 455/456.1; 455/414.1

(58) Field of Classification Search .... 455/456.1–456.6, 455/414.1–414.4, 418, 419
See application file for complete search history.

(56) References Cited

U.S. PATENT DOCUMENTS

| | | | |
|---|---|---|---|
| 7,260,474 B1 | 8/2007 | Thayathil et al. | |
| 7,495,608 B1 | 2/2009 | Chen et al. | |
| 2008/0293431 A1* | 11/2008 | Buerger et al. | 455/456.1 |
| 2009/0170532 A1* | 7/2009 | Lee et al. | 455/456.3 |
| 2009/0209239 A1* | 8/2009 | Montesdeoca | 455/414.2 |
| 2010/0035594 A1* | 2/2010 | Vendrow et al. | 455/417 |
| 2010/0048184 A1* | 2/2010 | Kim | 455/414.1 |
| 2010/0172251 A1* | 7/2010 | Adam et al. | 370/252 |
| 2011/0117879 A1* | 5/2011 | Radic et al. | 455/404.2 |

OTHER PUBLICATIONS

Marcus Jenkins, "Introduction to Route Calculation," Navteq: Network for Developers, Version 1.0-Q1 2007.

* cited by examiner

*Primary Examiner* — Kamran Afshar
*Assistant Examiner* — Khawar Iqbal

(57) ABSTRACT

A mobile station, and related methods, provide navigational assistance. The mobile station executes a local navigation application and can transition between network assisted navigation and stand-alone navigation that utilizes the local navigation application. Various events can cause the transition between the operational states.

23 Claims, 4 Drawing Sheets

MOBILE DEVICE NAVIGATION

TECHNICAL FIELD

The present subject matter relates to navigation assistance. In particular, the present subject matter relates to directional assistance (e.g., navigational assistance including both visual and audio guidance) using a mobile station operating on a mobile communications network.

BACKGROUND

Various wireless communications network operators offer directional assistance (e.g., navigational guidance that includes driving directions, turn-by-turn navigation in both visual and audio forms alone or in combination, etc.) via mobile stations operating on their respective networks. Typically, a network element(s) receives a starting location and a destination location from an end-user of a mobile station. The network element(s) then calculates the route information and provides navigation assistance to the end-user via the mobile station. One example of such a service is the VZ NAVIGATOR service offered by Verizon Wireless. Similar services may be offered to mobile station users by third party service providers that communicate with the mobile stations via the wireless mobile communication network.

In some cases, these services use network assisted global positioning system (aGPS) location determination of the mobile station and server based navigation services. That is, a network element, such as a position determining entity (PDE) aids in determining the latitude and longitude of the mobile station. In turn, this location is used by a navigation application server to provide the route guidance.

While this kind of service offers a user many advantages, it also has its drawbacks. In the existing mobile communication networks, a voice or data call occurring on a mobile station cannot happen at the same time when there is ongoing navigation session due to network and device limitation. That is, aGPS and server based navigation requires a communication channel be established and maintained in order to provide the navigational assistance. Some networks, such as the current CDMA networks, do not support simultaneous network connection and data connection. Because aGPS navigation is server based, the mobile station needs to keep the network connection open throughout the navigation session in order to access the resources on the server at any time.

Also in the existing system, the navigation session is suspended if the user goes outside network coverage or receives/dials a voice or data call. That is, the mobile station stops receiving navigation information and providing directional assistance when the voice or data call is active. The mobile station resumes providing navigational assistance after the call ends. This can be very troublesome and inconvenient for the user. Thus, a need exists that allows the mobile station to continue to provide navigation assistance during a voice or data call.

SUMMARY

The teachings herein alleviate one or more of the above noted problems with the known methods of providing directional assistance. As shown and described below, the various systems and methods enable simultaneous network connection and navigation features on a mobile station. In some instances, a mobile station initially uses server based navigation by connecting to a mobile network in order to use aGPS and download map data and calculated route information from the server. When a voice or data call is placed or received, (e.g., a phone call, a messaging service message, a browser session, etc.) the mobile station switches from online mode to on-board (also referred to as stand-alone) mode of navigation that does not use network connection but instead uses on-device resources. Thus a user of the mobile station can accept the call or initiate a call while keeping navigation going. The on-board mode is also useful when the mobile station roams outside its home mobile communication network coverage because the mobile station can be used to provide directions without communicating with carrier's network.

In one example, when a call is about to begin the mobile station detects event trigger to disconnect from the network and switch from aGPS and server based navigational assistance mode to local stand-alone mode. The mobile station prepares to use resources on the mobile station for navigation. After the transition, the mobile station utilizes stand-alone GPS to acquire positioning info and uses maps stored on device to continue navigational assistance. In the event that the mobile station wanders off route, the mobile station will use route recalculation software residing on-device to obtain a new route. With the assistance from a multi-tasking capable operating system, the mobile station supports running both a call application and a navigation application simultaneously. The viewing and controlling areas of the two applications can be made visible on the same primary display and arranged through a well designed user interface. If the simultaneous session involves a voice call and navigation (that includes audio and/or visual feedback), the mobile station software can alert the user through an audible sound to signal the upcoming route guidance so user can stop the conversation momentarily to hear the navigation audio. Furthermore, audio mixing strategies can be deployed to make the user experience around simultaneous audio sessions as pleasant as possible. The described techniques allow the user of the mobile station to navigate without a network connection, or navigate while receiving or placing a mobile station call.

In one instance, a method of providing directional guidance to a user of mobile station for use in navigating to a destination is shown and described. The method includes receiving, over a communications channel established between the mobile station and a mobile communications network and outputting, on the mobile station, a user-perceivable representation of the received navigation information to provide directional guidance to the destination. The navigation information includes route information and map information generated by a device other than the mobile station. This can include both audio and visual information. The method also includes detecting an event at the mobile station, during the display of the navigation information and, in response to detecting the event, executing on the mobile station a local navigation application, the local navigation application obtaining location information of the mobile station using a global positioning receiver of the mobile station and locally processing the location information to continue to provide directional guidance to the destination. The event indicates that the communication channel is needed for another purpose.

In some examples, executing a local navigation application includes executing a route calculation application that locally calculates the directional guidance to the destination. The method can also include updating the display the of the mobile station with the locally calculated directional guidance. Also, the method can include returning to receiving navigation information generated at least in part by a device other than the mobile station after the completion of the event.

In various examples, the event includes receiving a messaging service message, receiving a telephone call, placing a telephone call, and dropping coverage from the mobile communications network.

In another instance, a mobile station is shown and described. The mobile station includes a transceiver, a global positioning transceiver, and a processor. The transceiver supports wireless communications via a mobile communications network. The global positioning transceiver communicates with a constellation of global positioning satellites. The processor communicates with the transceiver and the global position transceiver. The processor executes an assisted navigation application and a local navigation application. The assisted navigation application processes navigation information comprising route information and map information that is generated by a device other than the mobile station. The local navigation application executes in response to the detection of an event during the execution of the assisted navigation application. The local navigation application obtains location information using the global positioning receiver and locally processes the location information to continue to provide directional guidance to the destination.

In another instance, an article of manufacture is shown and described. The article includes a machine readable storage medium and a first set of executable program instructions embodied in the machine readable storage medium that when executed by a programmable system of a mobile station cause the system to perform functions. The functions include receiving, over a communications channel established between the mobile station and a mobile communications network, navigation information, outputting a user-perceivable representation of the received navigation information to provide directional guidance to the destination and detecting an event at the mobile station, during the display of the navigation information. The navigation information includes route information and map information, the navigation information being generated by a device other than the mobile station. The event indicates that the communication channel is needed for another purpose.

The article also includes a second set of executable program instructions embodied in the machine readable storage medium. When the instruction are executed by a programmable system of a mobile station cause the system to perform functions that include in response to detecting the event, executing on the mobile station a local navigation application. The local navigation application obtains location information of the mobile station using a global positioning receiver of the mobile station and locally processes the location information to continue to provide directional guidance to the destination.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As shown and described below in greater detail, the use of maps on-board of a mobile station, embedded software, and stand-alone GPS allows user to continue using their mobile station to provide navigational assistance without network coverage, or make or receive a voice or data call during navigation without having to suspending the navigational assistance. Said another way, by leveraging the processing and memory capabilities of the mobile station, in combination with the mobile station's GPS capabilities, the mobile station can continue to provide navigational assistance during a telephone call, when the mobile station roams off-network, or during the reception or transmission of a messaging service message, or some other event. As result, the end-user can now "multitask" during the navigation session and still not get lost.

Figure 1:
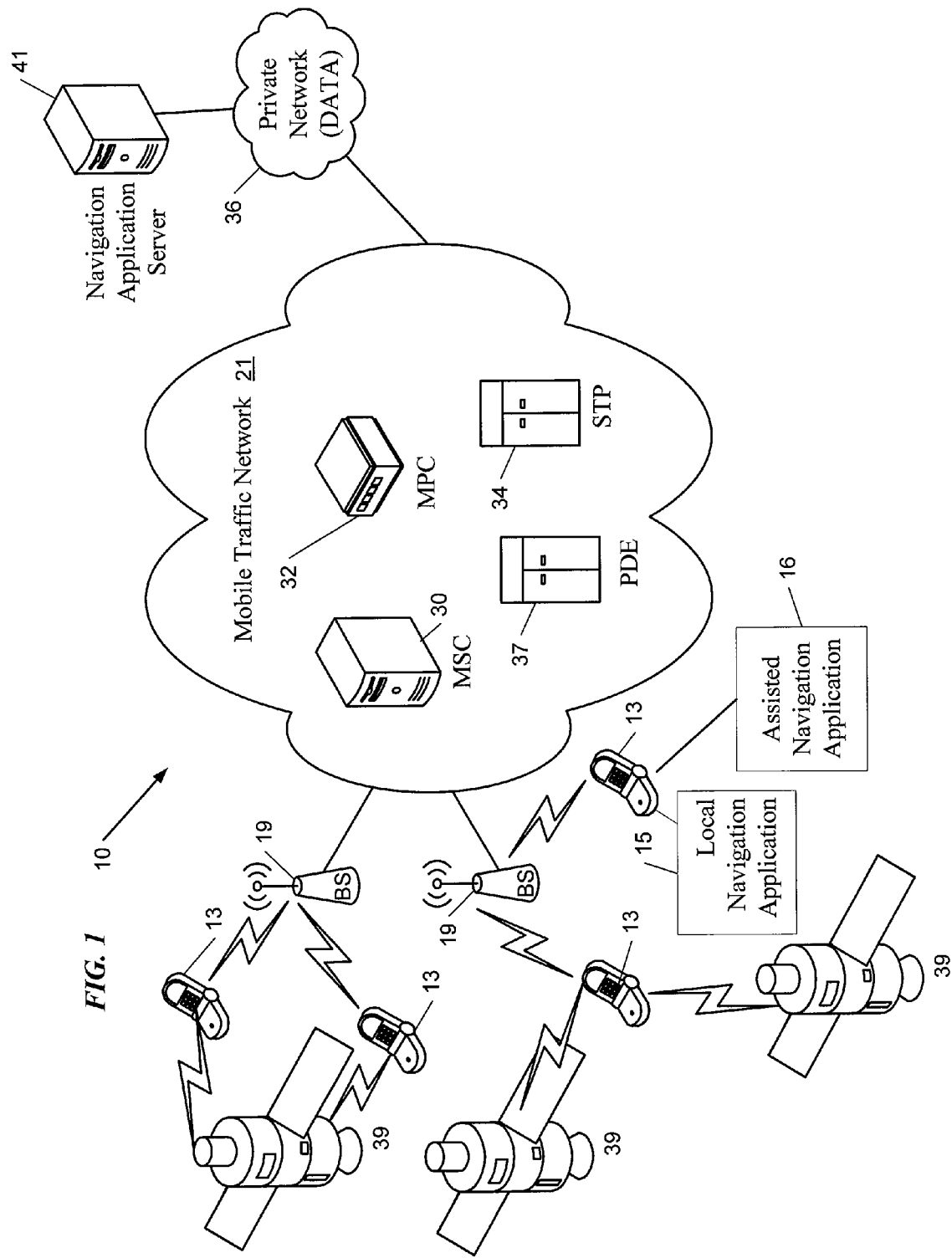
FIG. 1 is a functional block diagram that depicts various components of an exemplary mobile communications network.

Reference now is made in detail to the examples illustrated in the accompanying drawings and discussed below. FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations (not shown) outside the mobile communication network 10.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may be capable of conventional voice telephone communications and data communications.

For purposes of later discussion, several mobile stations 13 appear in the drawing, to represent examples of the mobile stations that may receive various services via the mobile communication network 10. For example, the mobile stations 13 can receive location based services (LBS) that leverage the use of an internal global position system (GPS) transceiver. The GPS receiver alone, or in combination (aGPS) with other network elements can determine the latitude and longitude of the mobile station 13. The location of the mobile station 13 can be used to provide one or more location based services (LBS). One of example of a location based service is navigational assistance (e.g., driving directions, turn-by-turn navigation, route calculation, points of interest location, etc.).

Mobile stations 13 typically take the form of portable handsets, smart-phones or personal digital assistants, although they may be implemented in other form factors. At least one of the mobile stations 13, for example, intended for providing stand-alone navigational assistance, can include a local navigation application (LNA) 15, that can be downloaded to the mobile station 13 or added thereto in some other way. Also, the mobile station 13 can include an assisted navigation application (ANA) 16 that coordinates with the other network elements (e.g., a position determining element and navigation application server) to provide navigational assistance. The LNA 15 and the ANA 16 are provided in a mobile station 13 that otherwise provides normal mobile communications services of the network 10 to a user of the mobile station. The LNA 15 and ANA 16 may be provided in any one mobile station, in a group (but not all) of the mobile stations, or in all users' mobile stations 13. The LNA 15 can leverage and cooperate with the GPS receiver of the mobile station 13 to provide navigational assistance when the mobile station 13 is also being used to provide voice or data communications. For example, turn-by-turn directions can be calculated by the mobile station itself during a telephone call.

Typically, the mobile station 13 operates using the ANA 16, aGPS, and server based navigation. That is, other network elements aid in determining the location of the mobile station 13 and calculate the navigation information requested by the mobile station 13. The calculated navigation information is provided via the network 10 to the mobile station 13, which in turn, communicates the navigation information to the mobile station user. However, when a messaging service message (e.g., SMS, MMS, EMS, etc.) is received by the mobile station the communications channel typically used to provide the navigation information to the mobile station 13 is used, instead, to deliver the messaging service message. Therefore, in order to continue to provide navigational assistance the mobile station 13 executes the LNA 15. That is, the mobile station transitions from the ANA 16 to the LNA 15 and it can also transition back to the ANA 16 after the completion of the call or other event.

Maps can be displayed on the mobile station 13 using both the LNA 15 and the ANA 16. Also, audio directions (e.g., turn-by-turn instructions) can be outputted at the mobile station by the ANA 16 and the LNA 15. One or more maps can be downloaded and stored locally within the memory of the mobile station 13. The LNA 15 can include route calculation instructions that can calculate and recalculate directions to a specified location based on the current location of the mobile station 13. Again, these instructions can be outputted in both audio and visual user-perceivable formats. The current location of the mobile station 13 can be determined by the mobile station 13 itself, without cooperation from one or more other network elements.

Both the ANA 16 and the LNA 15 can be configured to execute on many different types of mobile stations 13. That is, the LNA 15 and ANA 16 program can be written to execute on a binary runtime environment for mobile (BREW-based) mobile station, a Windows Mobile based mobile station, android, I-Phone, Java Mobile, or RIM based mobile station. These types of devices can employ a multi-tasking operating system.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13 will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, when the mobile stations are within range. Each base station typically includes a BTS coupled to several antennae mounted on a radio tower within a coverage area often referred to as a "cell." The BTS is the part of the radio network that sends and receives RF signals to/from the mobile stations 13 that the base station 19 currently serves.

The radio access networks also include a traffic network represented generally by the cloud at 21, which carries the user communications for the mobile stations 13 between the base stations 19 and other elements with or through which the mobile stations communicate. In some examples, the mobile traffic network 21 includes network elements that support LBS services such as mobile switching centers (MSCs) 30, signal transfer points (STP) 34, mobile positioning center (MPC) 32, and a position determining entity (PDE) 37. The network can also include other elements, which are not shown, that support functionality other than location based services. Examples include, but are not limited to, message centers (MCs), home location registries (HLRs), and other network elements such as wireless internet gateways (WIGs), and visitor location registers (VLRs) (not shown). Other individual elements such as switches and/or routers forming the traffic network 21 are omitted here form simplicity. Various combinations of the network elements cooperate to provide navigational services as described herein. It is understood that the various network elements can communicate with each other and other aspects of the mobile communications network 10 and other networks (e.g., the public switched telephone network (PSTN) and the Internet) either directly or indirectly.

The mobile switching center (MSC) 30 is responsible for managing communications between the mobile station and the other elements of the network 10. In addition, the MSC 30 is responsible for handling voice calls and messaging service message request as well as other services (such as conference calls, FAX and circuit switched data, messaging service communications, Internet access, etc.). The MSC 30 sets up and releases the end-to-end connection or session, and handles mobility and hand-over requirements during the call. The MSC 30 is sometimes referred to as a "switch". The MSC 30 manages the cell sites, the voice trunks, voicemail, and SS7 links. The LNA 15 may execute in response to network events that occur at the MSC 30. For example, the LNA 15 can begin executing on the mobile station 13 in response to the mobile 13 and the MSC 13 communicating to establish a call. The MSC 13 can signal the mobile station 13 using one or more communication channels that a call is to be established with the mobile station 13. When the mobile station is operating using aGPS and server based navigation services, it is possible the navigation information is being delivered via a channel needed to complete the call. Thus, when the LNA 15 begins to execute, the channel can be freed from use in delivering the navigation information and used, instead, to complete the call.

The PDE 37 is a network element that manages the position or geographic location determination of each mobile station 13. The exemplary network 10 utilizes an assisted GPS (aGPS) approach to the determination of mobile station location, in which the mobile station 13 takes measurements of signals from a number of GPS satellites 39 and interacts with the PDE 37 to process those measurements so as to determine the latitude and longitude (and possibly altitude) of the current location of the mobile station 13. The location information may be provided to another entity, such as an emergency service point in a 911 scenario, a navigation application server 41, or to the mobile station for mapping services and the like. In the context of navigational assistance, the PDE 37 provides location information about the mobile station 13 requesting navigational assistance to the navigation application server (NAS) 41. The NAS 41 uses the location information to calculate navigation information such as routing options, turn-by-turn directions, recalculated route directions, points of interests along a route, and the like.

The PDE system 37 is essentially a general purpose programmable device with an interface for data communication via the network 10 running server software and running programming for implementation of the PDE functions, such as device authentication, data cache and processing queue management. The PDE 37 stores (e.g. in cache memory) or has access to a complete and up to date set of the satellite data for the constellation of GPS satellites 39 needed to allow computation of position based on pseudorange measurements of satellite signals by mobile stations 13. The data may include that associated with the entire constellation but will at least include the data for the satellites expected to be broadcasting into the geographic region serviced by the network 10.

When a mobile station 13 attempts a GPS position fix, the mobile station 13 provides information allowing the PDE 37 to perform a pre-fix. Typically, the mobile station 13 will provide data identifying the base station 19 through which it is receiving service (and possibly the serving sector). In some implementations, the PDE 37 may receive data regarding several base stations/sectors and signal strengths thereof, for trilateration. The PDE 37 uses information about base station location(s) to process the data received from the mobile station so as to determine a region (e.g. area of the cell or sector, or a general area triangulated based on signals from several base stations) that the mobile station 13 is likely located within. The PDE 37 then uses the pre-fix location to parse the satellite data down, to assistance data that the mobile station 13 at the particular location needs in order to take GPS readings. The PDE 37 sends the parsed satellite data to the mobile station 13, for use in taking measurements of signals from appropriate satellites 39. The GPS assistance data may contain selected satellite almanac, satellite visibility, Doppler and clock correction information.

The mobile station 13 will, in turn, use this information (also known as acquisition assistance records) to take multiple satellite pseudorange measurements. Depending on the device/network configuration, the mobile station 13 or the PDE 37 can then calculate a final fix using these pseudorange measurements. The final fix computation provides latitude and longitude (and possibly altitude) coordinates for the current location of the mobile station 13.

If the mobile station 13 has full GPS computation capability, the station 13 can calculate the current latitude and longitude of the mobile station itself. This is useful when the mobile station operates in stand-alone mode and calculates the navigation information itself using the LNA 15. However, when aGPS server based navigation and the ANA 16 are used, the mobile station 13 may communicate the current latitude and longitude data to the PDE 37 through the network 10. In many cases, however, the mobile station 13 uses only its measurement capability, and the station forwards the measurement data to the PDE 37 to determine the final fix. In either case, the GPS processing leads to a situation in which the PDE 37 knows the latitude and longitude of the mobile station 13. If necessary, the PDE 37 can provide coordinates to the mobile station 13 or to another element (e.g., NAS 41) that needs or has requested the location of the particular mobile station 13. The mobile station can then use this information in outputting audio and/or visual directional information (e.g., maps and location information) about the mobile station 13 via the LNA 15 or the ANA 16.

In addition, the traffic network portion 21 of the mobile communications network 10 connects to a private data network 36. The private data network 36 connects to the traffic network portion 21 via a gateway (not shown). The gateway can provide protocol conversions between the protocols used by the traffic network 21 and the protocols used by the private data network 36.

In communication with the private data network can be various auxiliary services servers that provide additional services to the users of the network 10 and/or to operations support personnel of the service provider or carrier that operates the network 10. For example, one or more navigation application servers (NAS) 41 provide server based navigational assistance to the mobile station 13.

The NAS 41 calculates and provides navigation information that includes route information and map information for use by the mobile station 13. The NAS 41 can calculate route information between various starting and destination points. For example driving directions between a first location and a second location can be calculated based on information provided by the end-user via the mobile station 13. Also, the locations of various points of interest (e.g., gas stations, restaurants, and the like) along the route can be determined. Numerous know methods can be used to calculate the route information (e.g., Dijkstra's shortest path algorithm and an A-Star algorithm).

The NAS 41 can also store map information that can be used in conjunction with the direction information to provide a visual representation of the calculated directional assistance. The map information can be stored or supplied from various third parties in any of a number of known formats (e.g., Standard Interchange Format (SIF) and Geographic Data Files (GDF) or proprietary forms of GDF). One or more portions of the map information are communicated to the mobile station 13. This information can be used by the ANA 16 and the LNA 15 depending on whether the mobile station is operating using aGPS and server based navigation or stand-alone navigation. Of course, other techniques can also be used.

Figure 2:
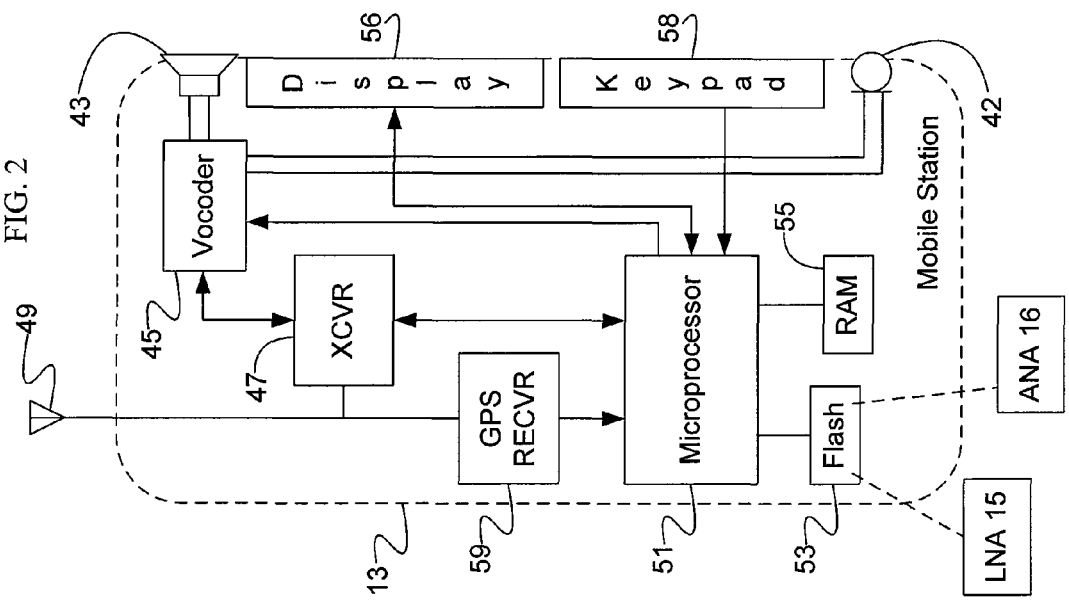
FIG. 2 is a simplified functional block diagram of a mobile station.

With reference to FIG. 2 a block diagram illustrating a GPS enabled mobile station 13 is shown and described. Although the station 13 may be incorporated into a vehicle mounted mobile unit or into another device, such as a portable personal computer or PDA, for discussion purposes the illustration shows the station 13 in the form of a handset. The handset embodiment of the mobile station 13 functions as a digital wireless telephone station. For that function, the station 13 includes a microphone 42 for audio signal input and a speaker 43 for audio signal output. The microphone 42 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes a digital transceiver (XCVR) 47. The concepts discussed here encompass embodiments of the station 13 utilizing any digital transceivers that conform to current or future developed digital wireless communication standards. For example, the transceiver 47 could be a TDMA or GSM unit designed for cellular or PCS operation. In the present embodiments, the digital transceiver 47 is a CDMA transceiver compatible with operation via an IS-95 network or a 1× network, to provide both voice and packet data communications. Also, the mobile station 13 may utilize either or both of 3GPP2 (1XRTT and EVDO) technologies and 3GPP (LTE/GSM/UMTS) technologies. In other Multimode transceivers also may be used.

The transceiver 47 provides two-way wireless communication of information, such as vocoded speech samples and/or digital message information. The transceiver 47 also sends and receives a variety of signaling messages in support of the various services provided via the station 13 and the network 10. Communications via the transceiver 47 and the antenna 49 may include various messages related acquisition assistance, position determination and related location based services. The transceiver 47 connects through RF send and receive amplifiers (not separately shown) to an antenna 49. In the example, the transceiver 47 is configured for RF communication in accord with a digital wireless protocol. The station 13 may include one or more additional transceivers, for example, for operation in an analog mode or in accord with an alternative digital standard.

A microprocessor 51 serves as the programmable controller in that it controls all operations of the mobile station 13 in accord with programming that it executes. The mobile station 13 also includes flash type program memory 53 and/or a non-volatile random access memory (RAM) 55, for storing various software routines and mobile configuration settings, such as mobile identification number (MIN), local map information, etc. In a present implementation, the flash type program memory 55 stores an operating system, device driver software, call processing software and vocoder control software; and the memory may store any of a wide variety of other applications, such as client browser software and short message service software.

Of note for purposes of this discussion, the stored program software will also include the local navigation application (LNA) 15 and the assisted navigation application (ANA) 16. The ANA 16 cooperates with the PDE 37 and the NAS 41 to provide assisted navigation in what is referred to as an "on-line" mode. In this mode, a communication channel between the network 10 and the mobile station 13 is maintained so that the navigation information generated by the NAS 41 can be communicated to the mobile station 13 as required. However, certain network events such as an incoming or outgoing call or messaging service message, may require the use of the channel between the mobile station 13 and the network 10. In response, the LNA 15 begins to execute on the microprocessor 51 of the mobile station 13.

LNA 15 enables the microprocessor 51 to perform functions to provide directional guidance. The LNA 15 leverages GPS information generated by the GPS receiver 59 without assistance from the PDE 37. In addition, the LNA 15 enables the microprocessor 51 perform route calculation, map updates, and route recalculation using the processing capabilities of the mobile station 13.

In one instance, the LNA 15 and ANA 16 are downloaded from one of the other network elements to the mobile station 13 and stored therein. Another approach includes downloading the programming over the air, from a third party server (not shown), from a OTAF provisioning system (not shown) or the like, The LNA 15 and the ANA 16 can also be loaded on the mobile station 13 by connecting the mobile station 13 to a personal computer (PC) and transferring the LNA 15 or ANA 16 from the PC to the mobile station 13 using known techniques.

The memories 53, 55 also store various data, such as telephone numbers and server addresses and data input by the user. For example, the memory 53 and/or the memory 55 will at various times store GPS location information, map information, and route calculation information. Depending on whether the ANA 16 or LNA 15 is executing, the amount of data stored in the memories 53, 55 can vary. For example, when a transition from the ANA 16 to the LNA 15 (i.e., from on-line mode to off-line mode, which is also referred to as stand-alone mode) occurs, map information can be downloaded and stored at the mobile station 13 before the channel is given over to the call or message traffic. Also, the map information can already be stored on the mobile station 13.

As shown, the digital telephone handset 13 includes a display 56 for displaying messages, menus or the like, call related information dialed by the user, calling party numbers, turn-by-turn directions (which can also be outputted in audio form) and map information. Also, the display is used to input information such as a starting point or a destination address. If the mobile station runs location based service applications, the display 56 may provide other information regarding the determined location and/or surrounding areas, e.g. LAT/LON data, map displays, turn-by-turn directions, and possibly displays of information about items of interest in and around the determined location. A keypad 58 enables dialing digits for voice and/or data calls and generating selection inputs keyed by the user based on any displayed menu. The display 56 and keypad 58 are the physical elements providing a textual or graphical user interface. In addition to normal telephone related input/output, these elements are also used for display of menus and other information to the user and user input of selections. For example, these elements can be used to input information related to navigation such as a destination address, way point, a starting address, and point-of-interest. Of course other user interface elements may be used, such as a stylus and touch sensitive display screen, as in a PDA or mobile smartphone.

For position determination and associated location based services such as navigational assistance, the mobile station 13 also includes a GPS receiver 59. Under control of the microprocessor 51, the GPS receiver 59 receives and processes signals from one or more satellites of the constellation of GPS satellites 39. From its processing, the GPS receiver 59 supplies GPS data to the microprocessor 51, such as pseudorange measurements and associated PN codes for measured satellite signals. Associated computations may be performed in the microprocessor or by a processor or the like included in the GPS receiver.

If the receiver 59 or the combination of the receiver and the microprocessor 51 are configured to provide a fully functional GPS position determination device, the station 13 could process the pseudorange measurements, absolute times of transmission of the GPS signals, and the satellite position data to compute the station's latitude and longitude. However, because of size/space/cost constraints on the design of the mobile stations 13, the GPS receiver 59 in the mobile station 13 often chooses to use only a reception capability, not the full GPS processing capability to resolve position from signals received from the satellites 39. Hence, the receiver 59 supplies the GPS measurement and code data to the microprocessor 51, which in turn formats the data and sends it to the PDE 37 using the wireless transceiver 47. The PDE 37 performs the data processing necessary to determine the latitude and longitude of the station 13 and transmits that data where needed, which in some cases will be back to the mobile station 13 for further processing by execution of the ANA 16.

Figure 3:
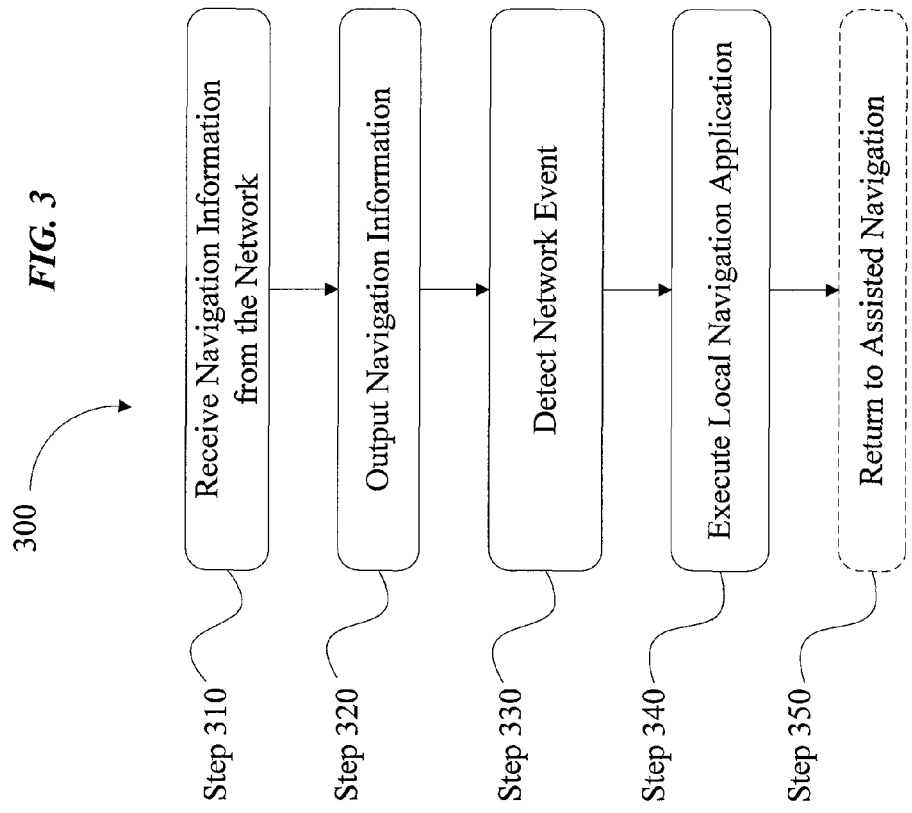
FIG. 3 is a flow chart showing an exemplary method of providing directional guidance to a user of mobile station for use in navigating to a destination.

With reference to FIG. 3 an exemplary method 300 of method of providing directional guidance to a user of mobile station for use in navigating to a destination is shown and described. In the shown example, the method 300 includes receiving (step 310) navigation information from one or more network elements (e.g., PDE 37 and NAS 41). The mobile station 13 outputs (step 320) the received navigation information to provide directional assistance to the end-user of the mobile station. The method 300 also includes detecting (step 330) a network event (e.g., an incoming call, a messaging service message, or dropping network coverage) at the mobile station 13. In response, execution (step 340) of the local navigation application (LNA) 15 begins and continues to provide the directional assistance to the end-user of the mobile station 13. In some cases, the method also includes returning (step 350) to network assisted navigation and execution of the ANA 16 after the completion of the network event.

As previously described, the mobile station 13 can receive (step 310) navigation information (e.g., directions, route information, map information, etc.) from one or more network elements. For example, the mobile station 13 can execute the assisted navigation application (ANA) 16, which cooperates with the PDE 37 and the NAS 41. The navigation information is communicated from the network elements to the mobile station 13 using a communications channel established between the MSC 31 and the mobile station 13. A portion of the navigation information (e.g., the map information) can also be received from a third party provider such as MapQuest or some other provider.

The mobile station 13 outputs (step 320) the received navigation information on the display 56. The outputting can include both audio and visual user-perceivable representations of the navigation information. Various combinations of both audio and visual information can be outputted at the mobile station 13. The outputting can include turn-by-turn directions, maps, audio instructions, or various combinations thereof. Also, outputting can include points-of-interest along or in proximity to the calculated route.

During the navigation session, the mobile station 13 detects (step 330) a network event. For example, the MSC 31 can signal the mobile station 13 of an incoming call or messaging service message, or the mobile station 13 may detect a drop in network coverage. Also, the mobile station 13 can signal the MSC 31 of an outgoing call or messaging service message. The event indicates that the communications channel between the mobile station 13 and the network 10 will no longer be available for the data session supporting the navigation assistance service (need for a call or message or unavailable because outside network coverage). Thus, the communications channel can not be used to provide network assisted navigation.

In response, the mobile station 13 executes (step 340) the local navigation application (LNA) 15. In one example, when a call is about to begin, the mobile station 13 receives an event trigger to disconnect from the network and switches from aGPS and server based service mode to local stand-alone mode and prepares to use resources on the device itself for navigation. While operating in stand-alone mode, the mobile station 13 utilizes the GPS receiver 59 to acquire positioning info and uses maps stored on-board the device to continue navigation. In the event that the user wanders off route, the mobile station 13 uses route recalculation software residing on the mobile station 13 as part of the LNA 15 to obtain a revised or new route. While operating in stand-alone mode, the mobile station 13 can run both a call application and the LNA 15 at the same time. The viewing and controlling areas of the two applications can be made visible on the same display 56. If the simultaneous session involves a voice call and navigation, the LNA 15 will alert the user through an audible sound to signal the upcoming route guidance so the user can stop the conversation momentarily to hear the navigation audio. Furthermore, audio mixing strategies can be deployed to make the user experience around simultaneous audio sessions comprehensible. As a result, these features will allow the user to navigate without network connection, or navigate while receiving or placing a call, sending or receiving important messages, browsing for important information using a web browser on the phone, and so on.

After the completion of the network event that interrupted the network based navigation assistance, the mobile station 13 can return (step 350) to operating in the assisted navigation mode. Doing so may save power resources on the mobile device or increase the speed/frequency at which navigation information is provided by the mobile station 13.

Figure 4:
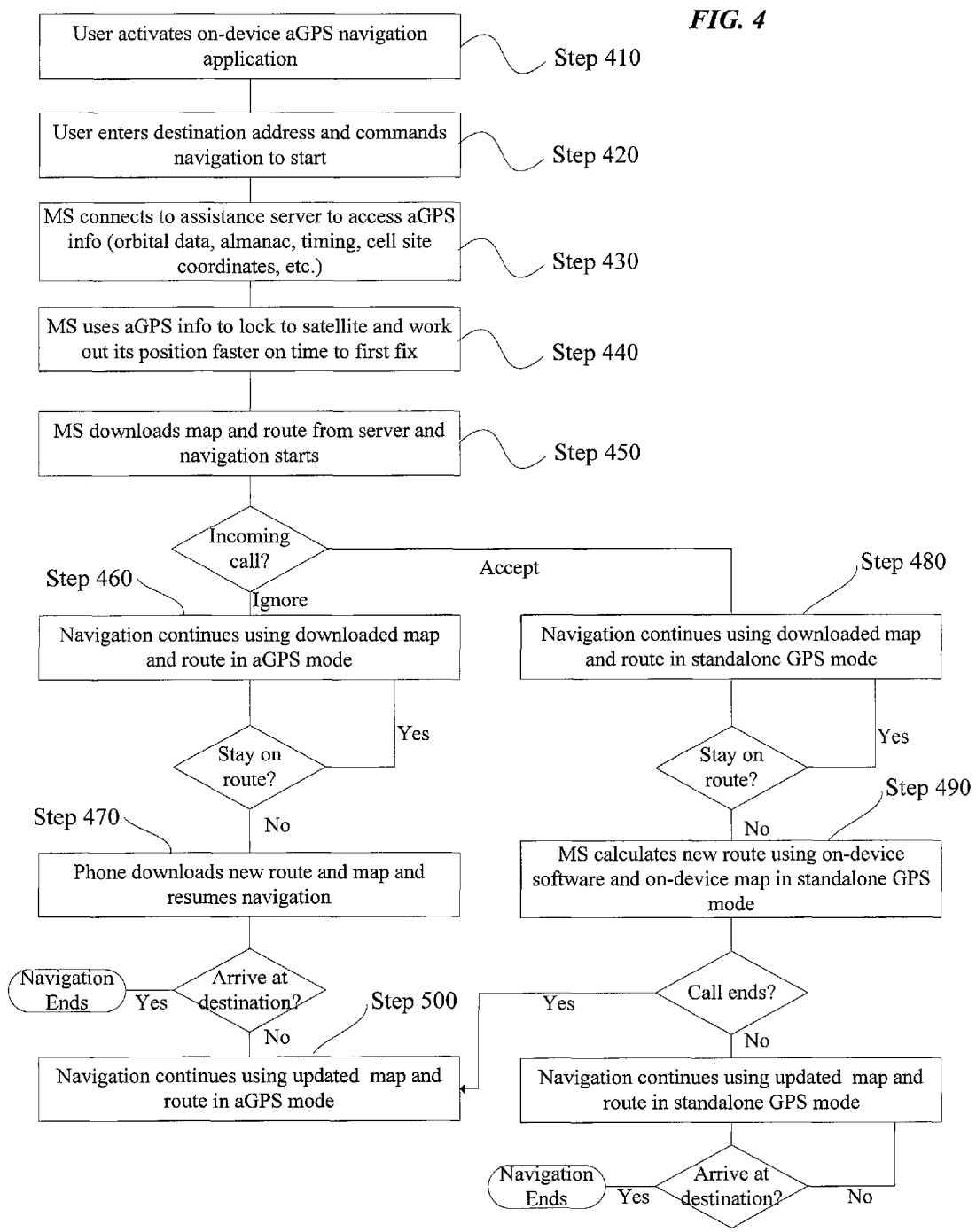
FIG. 4 is an exemplary call flow from the perspective of a mobile station.

FIG. 4 shows an exemplary call flow from the perspective of a mobile station 13. At the mobile station 13, the end-user activates (step 410) the assisted navigation application (ANA) 16. For example, the end-user launches the VZ Navigator application on their mobile station 13. The ANA 16 requests input from the end-user. In response, the end-user enters (step 420) one or more of a starting point, an ending point (e.g., a destination), and any points-of-interest along the way between. In response to these inputs, the mobile station 13 establishes a communications channel with the network 10 and connects (step 430) to the PDE 37 and NAS 41 via the network 10. As described above the PDE 37 leverages the GPS satellite 39 data (e.g., orbital data, almanac information, cell site information, etc.) to perform a prefix on the location of the mobile station 13. This allows for a fast initial determination of the location of the mobile station 13, when compared to mobile station only GPS fixing. The mobile station 13 uses (step 440) this prefix information to lock onto signals from a number of GPS satellites 39 and take measurements and calculate or obtain a final fix on its location. Further details of this procedure were described above with reference to FIG. 1. The mobile station 13 may download (step 450) navigation information (e.g., map and route information) generated and provided by the NAS 41 to begin assisted navigation.

During navigation, the mobile station 13 and the network 10 communicate via the established communication channel to provide location updates and navigational information updates to the ANA 16, which outputs this information at the mobile station 13. During this navigation session, the MSC 13 can signal the mobile station 13 of an incoming call. If the call is ignored (step 460) the mobile station continues using the aGPS and server based navigation technique. For example, if the mobile station goes off route, the NAS 41 and PDE 37 cooperate to provide (step 470) update navigation information (e.g., new map information and route information) to the mobile station 13.

However, if the end-user accepts the call at the mobile station 13, the local navigation application (LNA) 15 begins execution on the mobile device 13. The LNA 15 provides (step 480) the directional guidance to the destination without interacting with the other network elements. That is, the mobile station itself determines the mobile station's position using the on-board GPS receiver 59. To begin using the LNA, the current navigation information is provided to the LNA 15 before the communication channel is released for the call. That is, the current map and route information are downloaded from the NAS 41 and used by the LNA 15 to begin providing navigational assistance. If the mobile station goes off route, the mobile station 13 itself calculates (step 490) updates to the route information using the LNA 15 based on GPS coordinates generated by on-board GPS receiver 59. As mentioned previously, there are various known methods of route calculation that can be used.

As long as the call continues, the mobile station 13 continues to provide the navigational assistance. Said another way, the mobile station 13 acts as a stand-alone GPS unit that provides directional assistance. When the call ends, the mobile station 13 can transition (step 500) back to the assisted GPS mode (i.e., the server based) until the mobile station 13 arrives at the destination.

Figures 5, 6:
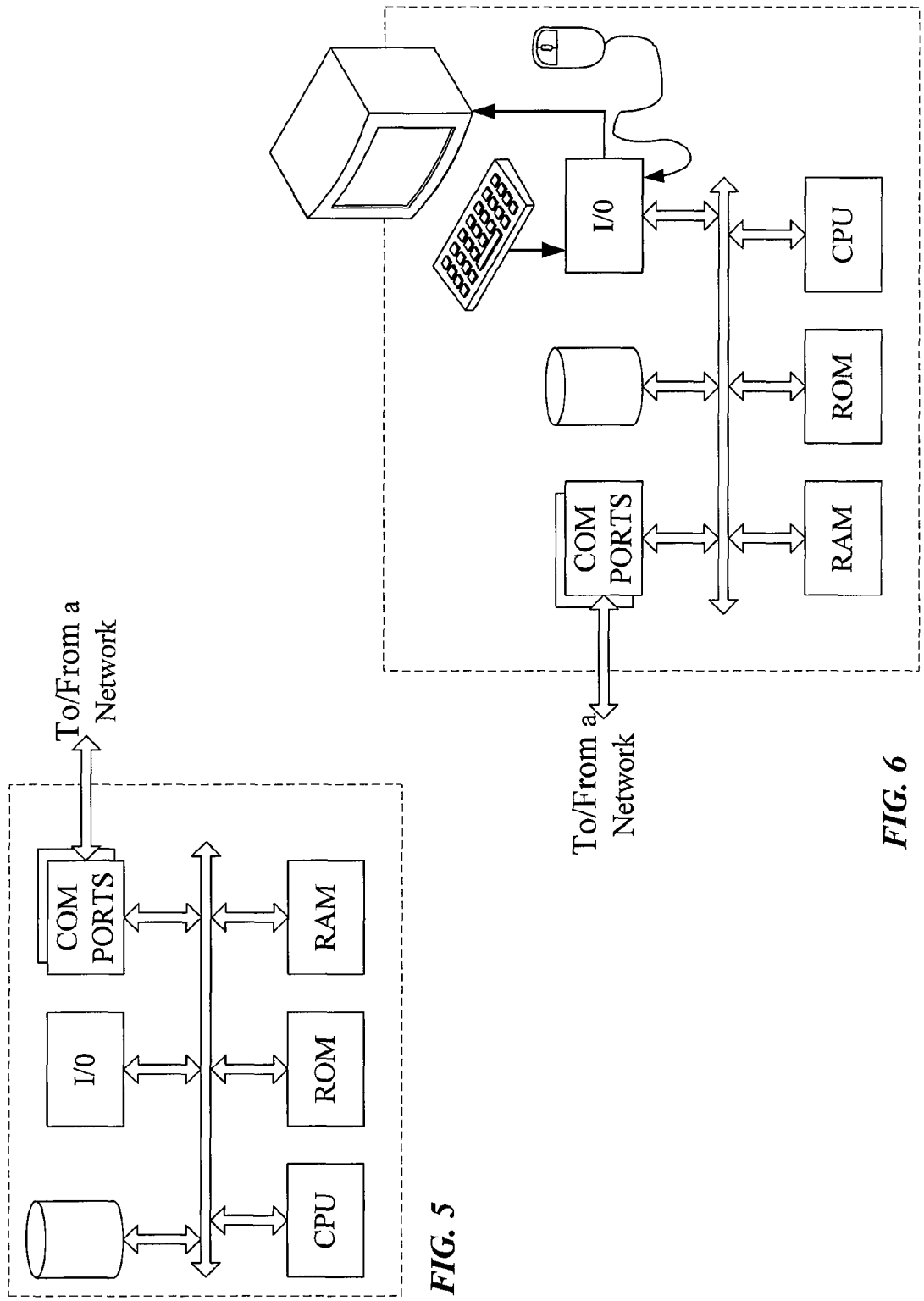
FIG. 5 is a simplified functional block diagram of a computer that may be configured as a host or server.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server or other network element (e.g., MSC 30, PDE 37, NAS 41, . . . ). FIG. 6 depicts a computer with user interface elements, as may be used to implement a personal computer (PC) or other type of work station or terminal device, although the computer of FIG. 6 may also act as a server if appropriately programmed. For example, such general purpose platforms may store the LNA 15 and ANA 16 and load the applications into a mobile station 13, via a network communication if the platform is a server or via a local link if the platform is a PC. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of providing navigational assistance via a mobile station 13 can be executed on a mobile station and on a network element such as a server. Program aspects of the technology may be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, the LNA and ANA software can be communicated to the mobile station 13. Similarly, software for the navigation application server 41 may be loaded into the hardware platform or platforms selected to perform that server function. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution Those skilled in the art will recognize that the present teachings are amenable to a variety of modifications and/or enhancements. For example, although some aspects of the present disclosure describe the NAS 41 being local to the network 10. However, one or more aspects of the NAS 41 functionality (e.g., route calculation, map information, etc.) can be provided by one or more third parties.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP2: 3rd generation partnership project 2
aGPS: assisted global position system
ANA: assisted navigation application
BS: base station
BTS: base transceiver system
CDMA: code division multiple access
CD-ROM: compact disc read-only memory
DVD: digital video disc
DVD-ROM: digital versatile (video) disc read-only memory
EPROM: erasable programmable read-only memory
EV-DO: evolution-data optimized
ESN: electronic serial number
GDF: geographic data files
GPS: global positioning system
GSM: global system for mobile communications
HLR: home location register
IP: Internet protocol
IR: infrared
LBS: location based services
LCD: liquid crystal display
LNA: local navigation application
LTE: long-term evolution
MC: message center
MIN: mobile identification number
MPC: mobile positioning center
MS: mobile station
MSC: mobile switching center
NAS: navigation application server
PC: personal computer
PDE: position determining entity
PN: pseudo-random noise
PROM: programmable read-only memory
PSTN: public switched telephone network
RAM: random access memory
RAN: radio access network
RF: radio frequency
SIF: Standard Interchange Format
SMS: short messaging service
SS7: signaling system 7
STP: signaling transfer points
TCP: transmission control protocol
TDMA: time-division multiple access
UMTS: universal mobile telecommunications system
USB: universal serial bus
VLR: visitor location register
WAN: wide are network
WIG: wireless interne gateway
XCVR: transceiver

What is claimed is:

1. A method of providing directional guidance to a user of mobile station for use in navigating to a destination, the method comprising the steps of:
receiving, over a communications channel established between the mobile station and a mobile communications network, navigation information comprising route information and map information, the navigation information being generated by a device other than the mobile station;
outputting, at the mobile station, a user-perceivable representation of the received navigation information to provide directional guidance to the destination;
detecting an event at the mobile station, during the outputting of the navigation information, the event indicating that the communication channel is no longer available to provide the navigation information;
in response to detecting the event, executing on the mobile station a local navigation application, the local navigation application obtaining location information of the mobile station using a global positioning receiver of the mobile station and locally processing the location information to continue to provide directional guidance to the destination; and
returning to receiving navigation information generated at least in part by a device other than the mobile station after the completion of the event.

2. The method of claim 1, wherein executing a local navigation application comprises executing a route calculation application that locally calculates the directional guidance to the destination.

3. The method of claim 2, further comprising updating the outputting at the mobile station with the locally calculated directional guidance.

4. The method of claim 1, wherein detecting an event comprises receiving a messaging service message.

5. The method of claim 1, wherein detecting an event comprises receiving a telephone call.

6. The method of claim 1, wherein detecting an event comprises placing a telephone call.

7. The method of claim 1, wherein detecting an event comprises dropping coverage from the mobile communications network.

8. The method of claim 1 further comprising in response to detection of the event, switching the mobile station from an assisted navigation mode to a local stand-alone navigation mode by at least terminating reception of the navigation information via the communication channel prior to executing the local navigation application.

9. The method of claim 8 further comprising in response to detection of the event, replacing the navigation information with voice or messaging data between the mobile station and the mobile communications network.

10. A mobile station, comprising:
a transceiver for wireless communications via a mobile communications network;
a global positioning transceiver for communicating with a constellation of global positioning satellites; and
a processor in communication with the transceiver and the global position transceiver, the processor executing an assisted navigation application and a local navigation application,
the assisted navigation application processing navigation information comprising route information and map information, the navigation information being generated by a device other than the mobile station, and
the local navigation application executing in response to the detection of an event during the execution of the assisted navigation application that indicates that the assisted navigation application is no longer receiving navigation information from a device other than the mobile station, the local navigation application obtaining location information using the global positioning receiver and locally processing the location information to continue to provide directional guidance to the destination;
wherein the assisted navigation application returns to receiving navigation information generated at least in part by a device other than the mobile station after the completion of the event.

11. The mobile station of claim 10, wherein the local navigation application comprises a route calculation application that locally calculates the directional guidance to the destination.

12. The mobile station of claim 10, wherein the local navigation application updates the display at the mobile station with the locally calculated directional guidance.

13. The mobile station of claim 10, wherein the event comprises receiving a messaging service message.

14. The mobile station of claim 10, wherein the event comprises placing a telephone call.

15. The mobile station of claim 10, wherein the event comprises receiving a telephone call.

16. The mobile station of claim 10, wherein the event comprises dropping coverage from the mobile communications network.

17. An article of manufacture comprising:
a machine readable storage medium; and
a first set of executable program instructions embodied in the machine readable storage medium that when executed by a programmable system of a mobile station cause the system to perform functions comprising:
    receiving, over a communications channel established between the mobile station and a mobile communications network, navigation information comprising route information and map information, the navigation information being generated by a device other than the mobile station;
    outputting, at the mobile station, a user-perceivable representation of the received navigation information to provide directional guidance to the destination; and
    detecting an event at the mobile station, during the display of the navigation information, the event indicating that the communication channel is no longer available to provide the navigation information; and
a second set of executable program instructions embodied in the machine readable storage medium that when executed by a programmable system of a mobile station cause the system to perform functions comprising:
    in response to detecting the event, executing on the mobile station a local navigation application, the local navigation application obtaining location information of the mobile station using a global positioning receiver of the mobile station and locally processing the location information to continue to provide directional guidance to the destination; and
    returning to executing the first set of executable program instructions to receive navigation information generated at least in part by a device other than the mobile station after the completion of the event.

18. The article of manufacture of claim 17, wherein the function of executing a local navigation application comprises the function of executing a route calculation application that locally calculates the directional guidance to the destination.

19. The article of manufacture of claim 18, wherein the function of executing a local navigation application further comprises the function of updating the display at the mobile station with the locally calculated directional guidance.

20. The article of manufacture of claim 17, wherein the function of detecting an event comprises the function of detecting a messaging service message.

21. The article of manufacture of claim 17, wherein the function of detecting an event comprises the function of receiving a telephone call.

22. The article of manufacture of claim 17, wherein the function of detecting an event comprises the function of placing a telephone call.

23. The article of manufacture of claim 17, wherein the function of detecting an event comprises the function of dropping coverage from the mobile communications network.

* * * * *